(12) United States Patent
Biebach

(10) Patent No.: US 12,552,260 B2
(45) Date of Patent: Feb. 17, 2026

(54) TRANSFORMER FOR A WATERCRAFT, ENERGY DISTRIBUTION SYSTEM FOR A WATERCRAFT, AND WATERCRAFT

(71) Applicant: Torqeedo GmbH, Wessling (DE)

(72) Inventor: Jens Biebach, Wessling (DE)

(73) Assignee: Torqeedo GmbH, Wessling (DE)

( * ) Notice: Subject to any disclaimer, the term of this patent is extended or adjusted under 35 U.S.C. 154(b) by 0 days.

(21) Appl. No.: 18/720,726

(22) PCT Filed: Dec. 16, 2022

(86) PCT No.: PCT/EP2022/086506
§ 371 (c)(1),
(2) Date: Jun. 17, 2024

(87) PCT Pub. No.: WO2023/111338
PCT Pub. Date: Jun. 22, 2023

(65) Prior Publication Data
US 2025/0065727 A1    Feb. 27, 2025

(30) Foreign Application Priority Data
Dec. 17, 2021 (DE) .............. 10 2021 133 727.5

(51) Int. Cl.
*B60L 15/00* (2006.01)
*B63H 21/17* (2006.01)
*H02J 4/00* (2006.01)
*H02M 7/68* (2006.01)

(52) U.S. Cl.
CPC ........... *B60L 15/007* (2013.01); *B63H 21/17* (2013.01); *H02J 4/00* (2013.01); *H02M 7/68* (2013.01); *B60L 2200/32* (2013.01); *B60L 2210/30* (2013.01); *H02J 2310/42* (2020.01)

(58) Field of Classification Search
CPC .. H02J 2310/42; B60L 2200/32; B63H 23/24; B63H 21/17
See application file for complete search history.

(56) References Cited

U.S. PATENT DOCUMENTS

2017/0133858 A1* 5/2017 Pan ....................... H02J 3/36
2017/0373502 A1* 12/2017 Gjerpe .................. H02J 3/38

FOREIGN PATENT DOCUMENTS

| CN | 110829433 A | 2/2020 | |
| CN | 112421679 A | 2/2021 | |
| WO | WO-2020020325 A1 * | 1/2020 | ............... H02J 3/00 |

OTHER PUBLICATIONS

International Preliminary Report on Patentability received for PCT Patent Application No. PCT/EP2022/086506, mailed on Jun. 27, 2024, 16 pages (9 pages of English Translation and 7 pages of Original Document).

* cited by examiner

*Primary Examiner* — Ryan Johnson
(74) *Attorney, Agent, or Firm* — ArentFox Schiff LLP

(57) ABSTRACT

An energy distribution system is provided that includes a first AC bus; a second AC bus for connecting to at least one second AC load; a third AC bus for connecting to a supply network; a transformer that converts an alternating voltage of each of the first to third AC buses into an alternating voltage of each of the other of the first to third AC buses; a DC bus; an energy storage device connected to the DC bus; and a bidirectional AC-DC power converter that is connected between the first AC bus and the DC bus.

17 Claims, 7 Drawing Sheets

Figure 1:
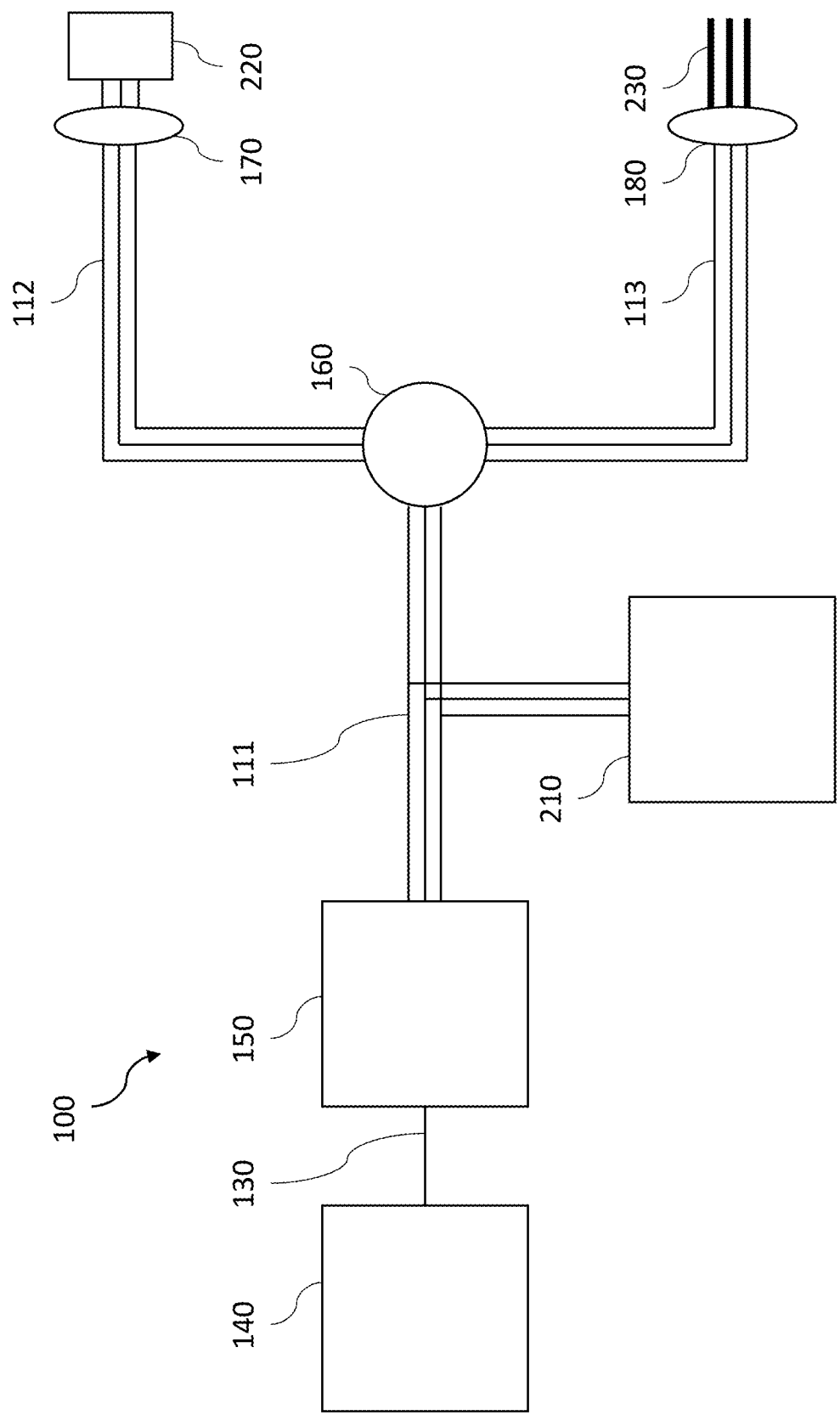

TRANSFORMER FOR A WATERCRAFT, ENERGY DISTRIBUTION SYSTEM FOR A WATERCRAFT, AND WATERCRAFT

CROSS-REFERENCE TO RELATED APPLICATIONS

This application is a National Phase Application of PCT International Application No. PCT/EP2022/086506, having an International Filing Date of Dec. 16, 2022 which claims priority to German Application No. 10 2021 133 727.5 filed Dec. 17, 2021, the contents of each of which are hereby incorporated by reference in its entirety.

TECHNICAL FIELD

The present invention relates to a transformer for a water vehicle, a power distribution system for a water vehicle, and a water vehicle including such a transformer, and a water vehicle including such a power distribution system.

PRIOR ART

Water vehicles, for example ships, boats, and ferries, usually include electric loads, like an electric drive motor, for example, and one or more auxiliary electric consumers. The electric loads are usually configured as AC (alternating current or alternating voltage) load, that is, they are operated by using alternating current and alternating voltage, respectively. The drive motor and the auxiliary consumers are typically operated with a 3-phase alternating voltage, wherein the voltage level for the drive motor and the voltage level for the auxiliary consumers may be different.

In order to operate the water vehicle in a way independent of an external power grid, an electric power storage device, for example a battery or a battery bank, is further provided. The power storage device typically supplies a direct voltage. In order to load the power storage device with power from the external power grid, which is also called a land-based power grid, or briefly shore power, a loading device or a switched-mode power supply including a rectifier, also denoted as AC/DC (direct current) converter in the following, is required. On the other hand, to supply power to the AC loads from the power storage device while the water vehicle is driving, at least an inverter is required, which is also denoted as inverter or DC/AC-converter in the following.

Typically, when connected to the land-based power grid, at first power will be supplied to the power storage device from the land-based power grid to load the power storage device. Then, the auxiliary consumers are supplied with power from the power storage device using the inverter to operate the auxiliary consumers.

A disadvantage of this solution is that a rectifier for loading the power storage device with power from the power grid and an inverter for supplying power to the AC loads from the power storage device are required. As a result, such a power distribution system has a relatively low total efficiency, high costs, a low reliability, and a high degree of complexity. In addition, the AC loads and the power distribution systems are not electrically isolated from the land-based grid

Specification of the Invention

Starting from known prior art, it is an objective of the present invention to solve the problems existing in prior art.

In particular, it is an objective of the present invention to supply electric power to a water vehicle in a simple, cost-efficient, secure, reliable, and effective way. Further, it is an objective of the present invention to provide a water vehicle having an advanced electric isolation between a power grid, in particular a land-based power grid, and the on-board power supply of the water vehicle.

The objectives are solved by the subject-matter of the independent claims. Advantageous developments result from the respective dependent claims, the specification, and the figures.

According to a first aspect of the present disclosure, a transformer for a water vehicle is provided. The transformer is configured to convert each of the first alternating voltage from a first AC bus, a second alternating voltage from a second AC bus, and a third alternating voltage from a third AC bus into an alternating voltage from each of the others of the first to third AC busses.

According to a second aspect of the present disclosure, a power distribution system for a water vehicle is provided. The power distribution system comprises the first AC bus, the second AC bus for connecting to the at least one second AC load like an auxiliary consumer of the water vehicle, and the third AC bus for connecting to a power supply. The first AC bus may be configured for connecting to at least one first AC load, like an electric drive motor of the water vehicle. Alternatively, or in addition, the DC bus may be configured to be connected with at least one DC load. The power distribution system further comprises the transformer according to embodiments of the present disclosure. The power distribution system, in particular the first and second AC busses, and the DC bus, may also be denoted as on-board power supply of the water vehicle. In addition, the power storage system comprises a DC bus, and a power storage device which is connected to the DC bus, and a bidirectional AC/DC converter, which is connected between the first AC bus and the DC bus.

According to a further aspect of the present disclosure, a water vehicle is provided. The water vehicle may comprise a power distribution system and/or a transformer according to embodiments of the present disclosure.

The present invention is thus based on the concept to provide a transformer in a water vehicle. The transformer may be adapted to a line frequency, that is a frequency of the alternating voltage of the power grid. The transformer may comprise 3 winding systems for the first to third AC busses in order to convert the alternating voltages between the AC busses. The transformer enables a galvanic isolation between the AC busses of the water vehicle, in particular between the power grid and the first and second AC busses.

In case, the power grid is available, when the water vehicle is in the harbor, for example, the power distribution system may be supplied with power from the power grid by using the transformer. In particular, the power storage device may be supplied with power from the power grid for loading the power storage device, and the second AC load may be supplied with power from the power grid to operate the second AC load. Alternatively, or in addition, the second AC load may also be supplied with power from the power storage device. More precisely, power and DC voltage, respectively, may be provided for loading the power storage device by using the transformer and the bidirectional AC/DC converter. In addition, by means of the bidirectional AC/DC converter and the transformer the supply of the second AC load may be supported.

In case the power grid is not available, for example, when the water vehicle is driving at sea or is remote from the harbor, the first AC load and the second AC load may be supplied with power from the power storage device using the bidirectional AC/DC converter and transformer.

The electric isolation between the power grid and the on-board power supply and the power storage unit, respectively, the first load and the second load are achieved by the transformer. Thus, no AC/DC converter with electric isolation has to be used, instead an AC/DC converter may be used which does not include an electric isolation feature. This way, costs may be saved compared to an AC/DC converter including an electric isolation.

In addition, compared to prior art, in the solution according to the invention, a converter and/or a conversion stage is omitted. This results in a significant advantage in the overall efficiency during supply via the power grid which is also denoted as land-based power grid. In addition, the number of components of the power distribution system and the complexity thereof may be reduced. This results in an increased reliability of the power distribution system with reduced costs. In addition, the power distribution system may assume a peak shaving feature when connected to the power grid.

The aspects of the present disclosure may comprise one or more of the following optional features.

The transformer may further be configured to galvanically isolate each of the first to third AC busses from each of the others of the first to third AC busses. That is, the first to third AC busses may be galvanically isolated from each other by using the transformer. Alternatively, or in addition, the transformer may be configured to galvanically isolate the third AC bus and thus the power grid from the first AC bus and from the second AC bus and vice versa. That is, the first AC bus and the second AC bus may be galvanically isolated from the third AC bus and the power grid using the transformer.

The transformer may be configured to convert power by using each of the first or third alternating voltages in power with each of the others of the first to third alternating voltages. Here, the transformer may be configured to convert the effective value of each of the first to third alternating voltages in the effective value of each of the others of the first to third alternating voltages.

The transformer may be configured to convert power with the first alternating voltage in power with the second alternating voltage, to convert power with the first alternating voltage in power with the second alternating voltage, to convert power with the third alternating voltage in power with the first alternating voltage, to convert power with the third alternating voltage in power with the second alternating voltage. The transformer may also be configured to convert power with the second alternating voltage in power with the first alternating voltage and to convert power with the second alternating voltage in power with the third alternating voltage.

The transformer may be configured to perform at least one of the following functions. The transformer may be configured to transfer power from the first AC bus to the second AC bus. The transformer may be configured to transfer power from the first AC bus to the third AC bus. The transformer may be configured to transfer power from the third AC bus to the first AC bus. The transformer may be configured to transfer power from the third AC bus to the second AC bus. The transformer may be configured to perform at least two of the specified functions at the same time.

Here, the transformer may be configured to receive power with the first alternating voltage from the first AC bus, to convert it in power with the second alternating voltage, and to output the converted power to the second AC bus. Here, the transformer may be configured to receive power from the first AC bus with the first alternating voltage, to convert it in power with the third alternating voltage, and to output the converted power to the third AC bus. The transformer may be configured to receive power with the third alternating voltage from the third AC bus, to convert it in power with the first alternating voltage, and to output the converted power to the first AC bus. The transformer may be configured to receive power with the third alternating voltage from the third AC bus, to convert it in power with the first alternating voltage, and to output the converted power to the first AC bus. The transformer may be configured to receive power with the third alternating voltage from the third AC bus, to convert it in power with the second alternating voltage, and to output the converted power to the second AC bus.

The transformer may be connected to the first AC bus, the second AC bus, and the third AC bus. The transformer may include a first winding system which is connected to the AC bus, a second winding system which is connected to the second AC bus, and a third winding system which is connected to the third AC bus. The first to third winding systems may be wrapped around a common core of the transformer. The transformer may be configured to receive power with the first alternating voltage, power with the second alternating voltage and power with the third alternating voltage corresponding to the first AC bus via the first winding system, from the second AC bus via the second winding system, and from the third AC bus via the third winding system, and by using them to output it to the first AC bus, the second AC bus, and the third AC bus, respectively Thus, the first alternating voltage may be applied to the first winding system, the second alternating voltage may be applied to the second winding system, and the third alternating voltage may be applied to the third winding system.

The transformer may be configured in a way that it enables to balance imbalances of the load, that is imbalances in the sources and sinks, by using a dedicated switch, in particular a zigzag switch. The transformer may also include a zigzag switch. In particular, the second winding system of the transformer may include a zigzag switch. This is because in the connected subsystem, that is the second AC bus having at least one second AC load, if required, an unbalanced load may appear. Preferably, transformer switching groups may be used being adapted to compensate unbalanced loads in the second AC bus against the first and third AC busses.

Each of the first to third AC busses may be configured as alternating voltage and/or alternating current circuit or system. The DC bus may be configured as direct voltage and/or direct current system. The power grid may also be configured as alternating voltage and/or alternating current circuit or system, and this may also be denoted as an AC power supply.

The first AC bus is configured to transfer power with the first alternating voltage. The second AC bus is configured to transfer power with the second alternating voltage. The third AC bus is configured to transfer power with the third alternating voltage. "Alternating voltage of the first AC bus" denotes here, that the first alternating voltage is applied to the first AC bus. This also applies to the second AC bus, and the third AC bus, respectively. In addition, the power grid may be configured to transfer power with the third alternating voltage. The DC bus is configured to transfer power using a direct voltage.

The bidirectional AC/DC converter may be configured to transfer power between the DC bus and the first AC bus. The AC/DC converter may be configured to transfer power from the first AC bus to the DC bus. The AC/DC converter may be configured to transfer power from the DC bus to the first AC bus. Here, the AC/DC converter may be configured to receive power from the first AC bus with the first alternating voltage, to convert it in power with direct voltage, and output it to the DC bus.

The AC/DC converter may also be configured to receive power from the DC bus with direct voltage and convert it in power with the first alternating voltage, and output it to the first AC bus.

The power distribution system may be configured to transfer power from the power storage device to the first AC bus to operate the at least one first AC load using power from the power storage device. The power distribution system may be configured to transfer power from the power storage device to the second AC bus to operate the at least one second AC load using power from the power storage device. The power distribution system may be configured to transfer power from the power storage device to the DC bus to operate the at least one DC load using power from power storage device.

The power distribution system may be configured to transfer power from the power storage device to the third AC bus to supply power from the power storage device to the power grid. The power distribution system may be configured to transfer power from the power grid to the DC bus to load the power storage device with power from the power grid. The power distribution system may be configured to transfer power from the power grid to the second AC bus to operate the at least one second AC load using power from the power grid.

The power distribution system may be configured to simultaneously transfer power from the power storage device to the first AC bus via the DC bus and then to the first AC load to operate the at least one first AC load using power from the power storage device, and to transfer power from the power storage device to a second AC bus via the DC bus and the first AC bus and then to a second AC load to operate the at least second AC load using power from the power storage device.

Alternatively or in addition, the power distribution system may be configured to simultaneously transfer power from the power storage device via the DC bus and to the at least one DC load to supply and operate the DC load using power from the power storage device, and to transfer power from the power storage device to the second AC bus via the DC bus and the first AC bus and then to a second AC load to operate the at least second AC load using power from the power storage device.

Alternatively or in addition, the power distribution system may be configured to simultaneously transfer power from the power storage device via the DC bus, the first AC bus to the second AC bus and then to a second AC load to operate the at least one second AC load using power from the power storage device, and to transfer power from the power storage device to the third AC bus via the DC bus and the first AC bus and then to the power grid to supply power from the power storage device to the power grid.

Alternatively or in addition, the power distribution system may be configured to simultaneously transfer power from the power grid to the DC bus via the third AC bus and the first AC bus and then to the power storage device to load the power storage device with power from the power grid, and to transfer power from the power grid to the second AC bus via the third AC bus and then to the at least one second AC load to operate the at least second AC load using power from the power grid.

Alternatively or in addition, the power distribution system may be configured to simultaneously transfer power from the power grid to the second AC bus via the third AC bus and then to the second AC load, and to transfer power from the power storage device to the second AC bus via the DC bus and the first AC bus and then to at least a second AC load to simultaneously operate the at least one second AC load using power from the power storage device and the power grid.

At least two from the first alternating voltage of the first AC bus, the second alternating voltage of the second AC bus, and the third alternating voltage of the third AC bus may be different from each other. For example, the first alternating voltage of the first AC bus may have a nominal value or effective value of 100V to 300V, preferably 200V, or may have a nominal value or effective value of 300V to 500V, preferably 400V. The second alternating voltage of the second AC bus may have a nominal value or effective value of less than 1 kV, preferably 300V to 500V, in particular 400V. The third alternating voltage of the third AC bus may have a nominal value or effective value of less than 1 kV, in particular 115V, 230V, 400V, 500V, 690V or 800V. The third alternating voltage of the third AC bus may have a nominal value or effective value of 300V to 500V, preferably 400V, and may have a nominal value or effective value of 700V to 900V, preferably 800V. In addition, an alternating voltage of the power grid may correspond to the third alternating voltage of the third AC bus, that is the alternating voltage of the power grid may have a nominal value or effective value of 300V to 500V, preferably 400V, or may have a nominal value or effective value of 700V to 900V, preferably 800V, respectively.

The effective values of the first to third alternating voltages may be basically the same. For example, the first alternating voltage may have a nominal value or effective value of 300V to 500V, preferably 400V. The second alternating voltage may have a nominal value or effective value of 300V to 500V, preferably 400V. The third alternating voltage may have a nominal value or effective value of 300V to 500V, preferably 400V.

The first alternating voltage, the second alternating voltage and/or the third alternating voltage may have a frequency in the range of 45 Hz to 65 Hz, preferably 50 Hz or 60 Hz, or a frequency in the range of 350 Hz to 450 Hz, preferably 400 Hz. In particular, the first alternating voltage, the second alternating voltage and/or the third alternating voltage may have the same frequency, for example, a frequency in the range of 45 Hz to 65 Hz, preferably 50 Hz or 60 Hz, or a frequency in the range of 350 Hz to 450 Hz, preferably 400 Hz.

According to embodiments, the transformer may be configured as a 3-phase transformer. In addition, the first to third AC busses may be configured as 3-phase alternating current systems, that is a rotating current system, and thus comprise 3 phases. Accordingly, the first alternating voltage, the second alternating voltage, and the third alternating voltage may be a three-phase alternating voltage, and thus include 3-phases, respectively. Here, the first winding system of the transformer may include 3 first windings, which are connected to the 3 phases of the first AC bus, respectively. Also, the second winding system of the transformer may include 3 second windings, which are connected to the 3-phases of the second AC bus, respectively. Further, the third winding system of the transformer may include 3 third windings, which are connected to the 3-phases of the third AC bus, respectively. The AC/DC converter may also be configured as 3-phased or may have 3 phases. Here, the three phases of the AC/DC converter may be connected to the 3-phases of the first AC bus, respectively. The power grid may correspondingly be configured as a three-phase alternating current system.

According to alternative embodiments, the transformer may be configured as a single-phase transformer. Also, the first to third AC busses may be configured as single-phase alternating current systems and thus comprise one phase. Accordingly, the first alternating voltage, the second alternating voltage, and the third alternating voltage each may be a one-phase alternating voltage, and thus include one phase. Here, the first winding system of the transformer may include a first winding, which is connected to the one phase of the first AC bus. Also, the second winding system of the transformer may include a second winding, which is connected to the one phase of the second AC bus. Further, the third winding system of the transformer may include a third winding, which is connected to the one phase of the third AC bus. The power grid may correspondingly be configured as a one-phase alternating current system.

The third AC bus may be connected to the power grid or may be connectable therewith. The power distribution system may further comprise a power grid connection element. The power grid connection element may be configured to connect the third AC bus to an AC power supply. In other words, the third AC bus may be connectable or may be connected to the power grid using the power grid connection element. In particular, the third AC bus may be connectable to the power grid by using the power grid connection element. The third AC bus may be configured to receive power from the power grid by with the third alternating voltage and/or may be a configured to output power to the power grid with the third alternating voltage.

The second AC bus may be connected to the at least one second AC load or may be connectable therewith. The power distribution system may at least comprise a load connection element. The load connection element may be configured to connect the second AC bus to at least one second AC load. In other words, the at least one second load may be connected or may be connectable to the second AC bus using the load connection element. In particular, the second AC bus may be connectable to one of the at least one second AC load using a respective load connection element, or the second AC load may be connectable to the second AC bus using the load connection element. Alternatively, the second AC bus may be directly connected or may be connectable to the at least one second AC load, that is without load connection element.

The power storage device may be configured as battery bank, battery, battery module, and battery cell, or may comprise at least one of these elements. These elements may be Lithium-based, in particular Lithium-ion-based.

The AC/DC converter may be a line filter for filtering interferences transferred through the power grid to the power distribution system, in particular to the first AC bus, and/or for filtering interferences, in particular clock-frequency-related interferences and/or harmonics which are created by the AC/DC converter. The line filter may be configured as a low-pass filter or may comprise it.

The water vehicle may further comprise at least one first AC load which is connected to the first AC bus. The first AC bus may be configured to output power to at least one first AC load. The at least one first AC load may be configured to receive power from the first AC bus in order to be operated therewith. The at least one first AC load may be configured as electric motor, in particular an auxiliary electric motor, or electric drive motor, or may include it.

The water vehicle may further include at least one DC load which is connected or connectable to the DC bus. According to preferred embodiments, the at least one DC load is connected to the DC bus in a fixed way. The DC bus may be configured to transfer and output power to the at least one DC load. The at least one DC load is configured to receive power from the DC bus and to be operated therewith. The at least one DC load may be configured as or may comprise an electric motor, in particular an auxiliary electric motor, or electric drive motor for moving the water vehicle on the water.

According to embodiments, the at least one DC load may comprise a DC/DC converter and an electrically controlled electric motor. According to further embodiments, the at least one DC load may comprise a DC/AC converter and an electric motor. The electric motor may be configured as synchronous motor, preferably permanently excited, an asynchronous motor, and reluctance motor.

The at least one DC load may include a control unit for controlling the DC/AC converter and/or the electric motor. The DC/AC converter may be configured to convert and transfer power between the DC bus and the electric motor. More precisely, the DC/AC converter may be configured to transfer power from the DC bus to the electric motor. Here, the DC/AC converter may be configured to receive power with direct voltage from the DC bus and convert it in power using an alternating voltage, and output the converted power to the electric motor.

The water vehicle may further comprise at least one second AC load which is connected to the second AC bus. The second AC load may for example be a cooling device or an oven. The at least one second AC load may be directly connected to the second AC bus. The second AC bus may be configured to output power to the at least one second AC load. The at least one second AC load may be configured to receive power from the second AC bus in order to be operated therewith. The at least one second AC load may be connected to the second AC bus using a corresponding load connection element. According to embodiments, the water vehicle comprises a plurality of second AC loads.

The at least one second AC load may be configured as auxiliary consumer, in particular a powerful auxiliary consumer, air conditioning, heating, cooling, lightning system, or power supply unit for electric devices of users on the water vehicle or include them.

The water vehicle may further comprise a power supply system. The power supply system may be configured to provide power to the power distribution system. In particular, the power supply system may be configured to provide power to one of the first to third AC buses or the DC bus. The power supply system may comprise at least one generator, for example a photovoltaic system, a solar generator, or an hydrogenerator. The power supply system may further comprise an inverter which may also be denoted as DC/AC converter. The inverter may be configured to convert power provided by the generator in direct voltage to power with the second alternating voltage.

The water vehicle may be configured as boat, ship, and ferry.

The transformer and the power distribution system according to embodiments of the present disclosure are not limited to the use in a water vehicle. The transformer and the power distribution system may be used with any vehicle which includes a DC load, a first AC load, and/or a second AC load which have to be operated by using power from the power grid and/or power from the power storage device. For example, the transformer and the power distribution system may be adapted for use with an electric vehicle, for example an electric car, an electric truck, an e-scooter, or an electric airplane.

Further, the power distribution system is not limited to a single first AC bus and a single second AC bus. The power distribution system may thus include a plurality of first AC busses, each having a power storage device, respectively, a DC bus, an AC/DC converter which is connected between the first AC bus and the DC bus, and/or a plurality of second AC busses. The transformer may respectively comprise a plurality of first winding systems for the plurality of first AC busses, and a plurality of second winding systems for the plurality of second AC busses.

According to a further aspect of the present disclosure, a power distribution system for a water vehicle is provided here. The power distribution system comprises at least one first AC bus, at least one second AC bus for connecting to a corresponding second AC load, and the third AC bus for connecting to a power grid. The at least one first AC bus may be configured to connect to at least one corresponding first AC load. The power distribution system further comprises the transformer according to embodiments of the present disclosure. The power storage system further comprises for each of the at least one AC bus a DC bus, a power storage device which is connected to the DC bus, and a bidirectional AC/DC converter, which is connected between the first AC bus and the DC bus. The transformer may thus be connected to the at least one first AC bus, to the at least one second AC bus, and to the third AC bus.

SHORT DESCRIPTION OF THE FIGURES

Figure 3:
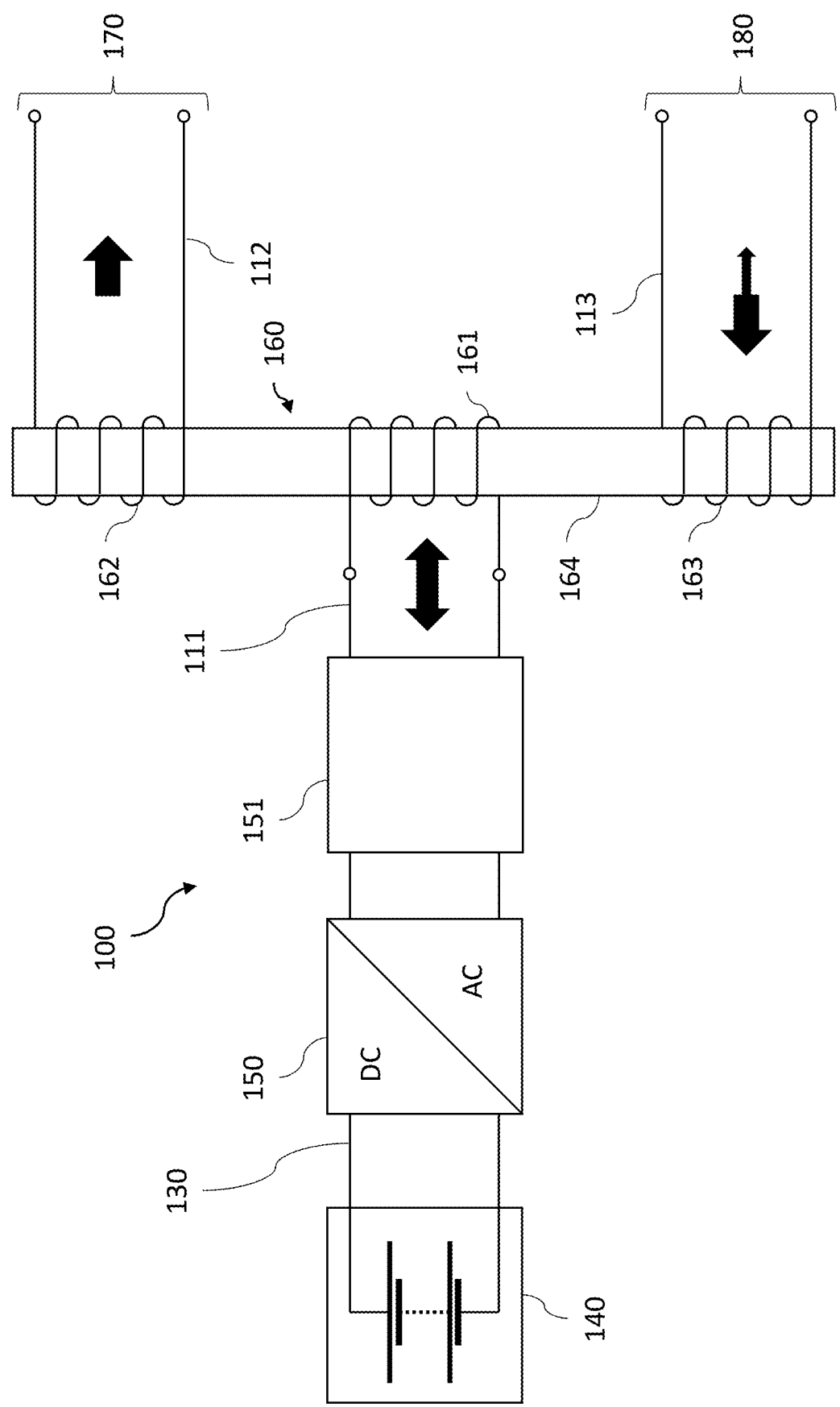
Figure 4:
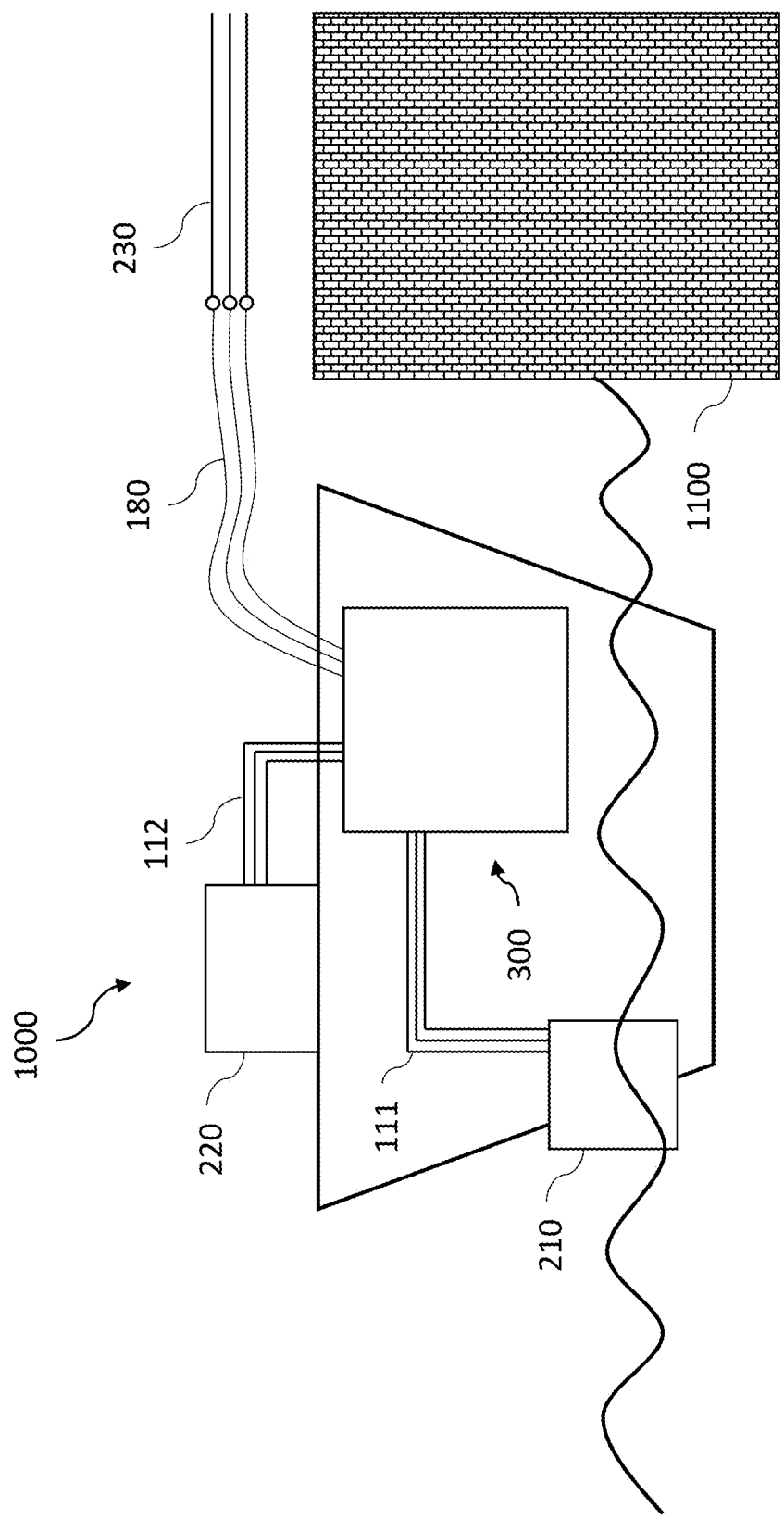

Preferred further embodiments of the invention will be explained in more detail by the explanation of the figures in the following. Here shows:

FIG. 1 a transformer and a power distribution system for a water vehicle according to embodiments of the present disclosure;

FIGS. 2A-2D a distribution of power by the power distribution system according to embodiments of the present disclosure for different cases;

FIG. 3 a transformer and a power distribution system for a water vehicle according to further embodiments of the present disclosure; and FIG. 4 a water vehicle according to embodiments of the present disclosure.

DETAILED DESCRIPTION OF PREFERRED EXEMPLARY EMBODIMENTS

In the following preferred exemplary embodiments are described with reference to the figures. Here, identical, similar or appearing similar elements in the different figures are denoted with identical reference numbers, and a repeated description of these elements is omitted to avoid redundancies.

FIG. 1 shows a transformer and an electric power distribution system for a water vehicle according to embodiments of the present disclosure.

The power distribution system 100 comprises a first AC bus 111 to connect the power distribution 100 to at least one of the first AC load 210 of the water vehicle (see FIG. 3), a second AC bus 112 to connect the power distribution system 100 to the at least one second AC load 220 of the water vehicle, and a third AC bus 113 to connect the power distribution system 100 to a power grid 230. The power distribution system 100, in particular a DC bus 130, the first AC bus 111, and the second AC bus 112 may also be denoted as on-board power supply of the water vehicle.

Further, the power storage system 100 comprises the DC bus 130, and a power storage device 140, and a bidirectional AC/DC converter 150, which is also denoted as inverter. The power storage device 140 is connected to the DC bus 130. The AC/DC converter 150 is connected between the first AC bus 111 and the DC bus 130. In other words, the AC/DC converter 150 is connected to the DC bus 130 and the first AC bus 111.

Each of the first to third AC buses 111, 112, 113 is configured as an alternating current system The DC bus 130 is configured as direct current circuit. The power grid 230 is also configured as an alternating current system. The power grid 230 may also be denoted as a land-based power grid or shortly as "shore power". The second AC load 220 may also be denoted as "hotel load" of the water vehicle.

The first AC bus 111 is configured to receive, transfer and output power with the first alternating voltage. The second AC bus 112 is configured to receive, transfer and output power with the second alternating voltage. The third AC bus 113 is configured to receive, transfer and output power with the third alternating voltage. The power grid 230 is also configured to receive, transfer and output power with the third alternating voltage. The DC bus 130 is configured to receive, to transfer and output power using direct voltage. Thus, the first alternating voltage is applied to the first AC bus 111, the second alternating voltage is applied to the second AC bus 112, and the third alternating voltage is applied to the third AC bus 113 and the power grid 230. A direct voltage is applied to the DC bus 130.

The power distribution system 100 further includes a transformer 160. That transformer 160 is configured for the water vehicle (see FIG. 3). The transformer 160 is connected to the first AC bus 111, the second AC bus 112, and the third AC bus 113.

According to embodiments, the transformer 160 is configured to galvanically isolate the third AC bus 113 and thus the power grid 230 from the first AC bus 111 and from the second AC bus 112 as part of the on-board power supply and vice versa. Alternatively or in addition, the transformer 160 is configured to galvanically isolate each of the first to third AC busses 111, 112, 113 from each of the others of the first to third AC busses. That is, the first to third AC busses 111, 112, 113 are galvanically isolated from each other by the transformer 1160.

The transformer 160 is configured to convert power with each of the first to third alternating voltages in power with each of the others of the first to third alternating voltages, for example, when the transformer 160 converts the effective value of each of the first to third alternating voltages in the effective value of each of the others of the first to third alternating voltages.

The transformer 160 may be configured to convert power with the first alternating voltage in power with the second alternating voltage, to convert power with the first alternating voltage in power with the second alternating voltage, to convert power with the third alternating voltage in power with the first alternating voltage, to convert power with the third alternating voltage in power with the second alternating voltage. The transformer 160 may also be configured to convert power with the second alternating voltage in power with the first alternating voltage and to convert power with the second alternating voltage in power with the third alternating voltage.

The transformer 160 is configured to transfer power between the first to third AC busses 111, 112, 113. More precisely, the transformer 160 is configured to transfer power from the first AC bus 111 to the second AC bus 112. The transformer 160 is configured to transfer power from the first AC bus 111 to the third AC bus 113. The transformer 160 is configured to transfer power from the third AC bus 113 to the first AC bus 111. The transformer 160 is configured to transfer power from the third AC bus 113 to the second AC bus 112. The transformer 160 is configured to perform at least two or all of these functions at the same time.

Hereto, the transformer 160 is configured to convert each of the first alternating voltage of the first AC bus 111, the second alternating voltage of the second AC bus 112, and the third alternating voltage of the third AC bus 113 into an alternating voltage from each of the others of the first to third AC busses 111, 112, 113. The transformer 160 is in particular configured to convert the effective value of each of the first or third alternating voltages in the effective value of each of the others of the first to third alternating voltages. Correspondingly, the ratios between the effective values of the currents of the AC busses are reciprocal to the ratios between the effective values of the alternating voltages of the AC busses.

More precisely, the transformer 160 is configured to receive power with the first alternating voltage from the first AC bus 111, to convert it in power with the second alternating voltage, and to output the converted power to the second AC bus 112. The transformer 160 is configured to receive power with the first alternating voltage from the first AC bus 111, to convert it in power with the third alternating voltage, and to output the converted power to the third AC bus 113.

The transformer 160 is further configured to receive power with the third alternating voltage from the third AC bus 113, to convert it in power with the first alternating voltage, and to output the converted power to the first AC bus 111. The transformer 160 is further configured to receive power with the third alternating voltage from the third AC bus 113, to convert it in power with the second alternating voltage, and to output the converted power to the second AC bus 112.

The transformer 160 includes a first winding system, which is connected to the first AC bus 111, a second winding system which is connected to the second AC bus 112, and a third winding system which is connected to the third AC bus 113. The first to third winding systems are wrapped around a common core of the transformer 160.

The transformer 160 may be configured in a way that it is adapted to balance imbalances of the load, that is imbalances in the sources and sinks, by using a dedicated switch, in particular a zigzag switch. The transformer 160 may also include a zigzag switch. In particular, the second winding system of the transformer 160 may include a zigzag switch. This is because in the connected subsystem, that is the second AC bus 112 having at least one second AC load 220, if appropriate, an unbalanced load may appear. Preferably, transformer switching groups may be used being adapted to compensate unbalanced loads in the second AC bus 112 against the first and third AC busses 111 and 113.

In particular, the first winding system, the second winding system and the third winding system may be galvanically isolated in order to achieve the galvanic isolation of the first to third AC busses 111, 112, 113 from each other. The transformer 160 is configured to receive power with the first alternating voltage, power with the second alternating voltage, and power via the third alternating voltage corresponding to the first AC bus 111 via the first winding system, from the second AC bus 112 via the second winding system, and from the third AC bus via the third winding system, and output it to the first AC bus 111, the second AC bus 112, and the third AC bus 113, correspondingly. Thus, the first alternating voltage is applied to the first winding system, the second alternating voltage is applied to the second winding system, and the third alternating voltage is applied to the third winding system. The AC/DC converter 150 is configured to convert and exchange power between the DC bus 130 and the first AC bus 111. More precisely, the AC/DC converter 150 is configured to transfer power from the first AC bus 111 to the DC bus 130. The AC/DC converter 150 is configured to transfer power from the DC bus 130 to the first AC bus.

Here, the AC/DC converter 150 is configured to receive power with the first alternating voltage from the first AC bus 111 and convert it in power with direct voltage, and output the converted power to the DC bus 130. The AC/DC transformer 150 is also configured to receive power with the direct voltage from the DC bus 130, to convert it in power with the first alternating voltage, and output it to the first AC bus 111.

The power storage device 140 is an electric power storage device 140. The power storage device 140 is configured to receive power, and to store power whereby being loaded, and to output the stored power whereby being discharged. The power storage device 140 is or includes a battery having a battery module or having a plurality of battery modules connected in series and/or parallel. The one battery module and the plurality of battery modules, respectively, each comprise one or more battery cells (not shown) which are connected in series and/or parallel. The one or more battery cells may be Lithium-based, in particular Lithium-ion-based. According to embodiments, the power storage device 140 may comprise a plurality of batteries. In this case, the power storage device 140 may be configured as battery bank.

The power distribution system 100, in particular the third AC bus 113, may be electrically connected or may be connectable to the power grid 230. According to preferred embodiments, the power distribution system 100 and/or the third AC bus 113 is detachable connected or connectable to the power grid 230.

According to the embodiment shown in the figures, the power distribution system 100 further comprises a power grid connection element 180. The power grid connection element 180 is configured to electrically connect the third AC bus 113 to an AC power supply 180. In other words, the third AC bus 113 may be connectable or may be connected to the power grid 230 by using the power grid connection element 180. In particular, the third AC bus 113 may be connectable to the power grid 230 using the power grid connection element. The third AC bus 113 is configured to receive power from the power grid 230 with the third alternating voltage, is configured to output power to the power grid 230 with the third alternating voltage.

As shown with reference to FIG. 3, the power grid connection element 180 may be configured as a cable with a connector. According to alternative embodiments, the power grid connection element 180 is configured as connector or outlet for connecting to a cable of the power grid 230.

The power distribution system 100, in particular the second AC bus 112, is electrically connected or is connectable to the at least one second AC load 220 of the water vehicle. According to embodiments, the power distribution system 100 and the second AC bus 112, respectively, are detachable connected or connectable to a second AC load 220. According to embodiments, the power distribution system 100 and/or the second AC bus 112 is directly connected or connectable to a second AC load 220. In other words, the second AC load 220 is connected to the second AC bus 112.

Alternatively or in addition, the power distribution system 100 comprises at least one load connection element 170. The load connection element 170 is configured to connect the second AC bus 112 to the at least one second AC load 220. In other words, the second AC load may be connected or may be connectable to the second AC bus 112 using the load connection element 170. In particular, the second AC bus 112 may be connectable to the second AC load 220, or the second AC load 220 may be connectable to the second AC bus 112 using the load connection element 170.

In the power distribution system 100 according to FIG. 1, the second AC bus 112 is connected to a second AC load 220 using a load connection element 170. As shown with reference to FIG. 3, the power supply connection element 170 may be configured as a cable which may include a connector. According to alternative embodiments, the power supply connection element 170 is configured as connector or outlet for connecting to a cable of the second AC load 220.

The first AC load 210 is connected to the first AC bus 111 or is connectable therewith. According to preferred embodiments, the first AC load 210 is connected to the first AC bus 111 in a fixed way. The first AC bus 111 is configured to transfer power to the first AC load 210 and output it. The first AC load 210 is configured to receive power from the first AC bus 210 and to be operated therewith.

The first AC load 210 may be configured as an asynchronous motor or may comprise it. According to embodiments, the asynchronous motor may be directly connected to the first AC bus 111, that means it may be directly connected onto the first AC bus 111. This configuration of the asynchronous motor is possible, for example, when no speed control of the first AC load 210 and/or of the other asynchronous motor is required. According to further embodiments, the asynchronous motor may be double-fed and/or the first AC load 210 may comprise a switch for speed control for the asynchronous motor.

The first AC/DC load 210 may be configured as or may comprise an electric motor, in particular an auxiliary electric motor, or electric drive motor for moving the water vehicle on the water. The first AC load 210 may comprise a control unit for controlling the switch and/or of the electric motor.

According to embodiments, at least one second AC load 220 is configured as auxiliary consumer of the water vehicle. For example, the at least one second AC load 220 may be an air conditioning, a heating, cooling, a lightning system or an electric power supply unit for electric devices of users on the water vehicle or may comprise one thereof. According to preferred embodiments, the water vehicle includes a plurality, at least two second AC loads 220.

The second AC bus 112 is configured to transfer and output power to the first AC loads 220. The second AC load 220 is configured to receive power from the second AC bus 220 and to be operated therewith. For example, the power of the AC bus 112 is used for air conditioning to cool or heat the water vehicle, or to generate light, for example to lighten the water vehicle or to supply power to electric devices.

The effective values of at least two of the first alternating voltage, the second alternating voltage, and the third alternating voltage may be different from each other. According to embodiments, the first alternating voltage has an effective value of about 200V or 400V, the second alternating voltage has an effective value of about 400V, and the third alternating voltage has an effective value of less than 1 KV, in particular about 115V, 230V, 400V, 500V, 690V, or 800V. The effective values of the first to third alternating voltages may be the same. According to embodiments, the first alternating voltage has an effective value of about 400V, the second alternating voltage has an actual voltage of about 400V, and the third alternating voltage has an effective value of about 400V.

The frequency of the first to third alternating voltages may be the same. According to embodiments, the first to third alternating voltages include a frequency of about 50 Hz. In addition, an alternating voltage of the power grid also corresponds to the third alternating voltage of the third AC bus. The alternating voltage of the power grid may thus also have an effective value of less than 1 kV, in particular about 115V, 230V, 400V, 500V, 690V, or 800V.

As shown in FIG. 1, the transformer may be configured as 3-phase transformer. In this case, the first to third AC busses 111, 112, 113 may be configured as 3-phase alternating current system and thus comprise 3 phases. Accordingly, the first alternating voltage, the second alternating voltage, and the third alternating voltage may each comprise a three-phase alternating voltage, and thus include 3 phases.

Here, the first winding system of the transformer 160 may include 3 first windings, which are connected to the 3 phases of the first AC bus 111, respectively. Also, the second winding system of the transformer 160 may include 3 second windings, which are connected to the 3 phases of the second AC bus 112, respectively. Further, the third winding system of the transformer 160 may include 3 third windings which are connected to the 3 phases of the third AC bus 113, respectively.

The AC/DC converter 150 may here also be configured as having 3 phases, and may thus include 3 phases. Here, the three phases of the AC/DC converter may be connected to the three phases of the first AC bus 111, respectively. The power grid 230 may also be configured as a three-phase alternating current system.

According to embodiments, the DC bus 130 may be configured for connecting to a DC load (not shown). The DC load is connected to the DC bus 130 or is connectable therewith. According to preferred embodiments, the DC load is connected to the DC bus 130 in a fixed way. The DC bus 130 is configured to transfer power to the DC load and output it. The DC load is configured to receive power from the DC bus 130 and to be operated therewith. Here, the DC load may be configured as an electric motor, in particular an auxiliary electric motor, or electric drive motor for moving the water vehicle on the water or may include it.

According to embodiments, the DC load may include a DC/DC converter and an electrically controlled electric motor. According to further embodiments, the DC load may comprise an DC/AC converter and an electric motor. The electric motor may be configured as synchronous motor, preferably permanently excited, an asynchronous motor, and reluctance motor. The DC load may comprise a control unit for controlling the DC/AC converter and/or the electric motor.

The DC/AC converter may be configured to convert and transfer power between the DC bus 130 and the electric motor. More precisely, the DC/AC converter may be configured to transfer power from the DC bus 130 to the electric motor.

Here, the DC/AC converter may be configured to receive power with direct voltage from the DC bus and convert it in power using an alternating voltage, and to output the converted power to the electric motor. The alternating voltage of the power output to the electric motor may be a 3-phase alternating voltage. In other words, the DC/AC converter may include a 3-phase AC side:

FIGS. 2A-2D show a distribution of power by the power distribution system according to embodiments of the present disclosure for different cases. In the following, losses of power of the busses, the AC/DC converter, and the transformer are not taken into consideration.

Figure 2A:
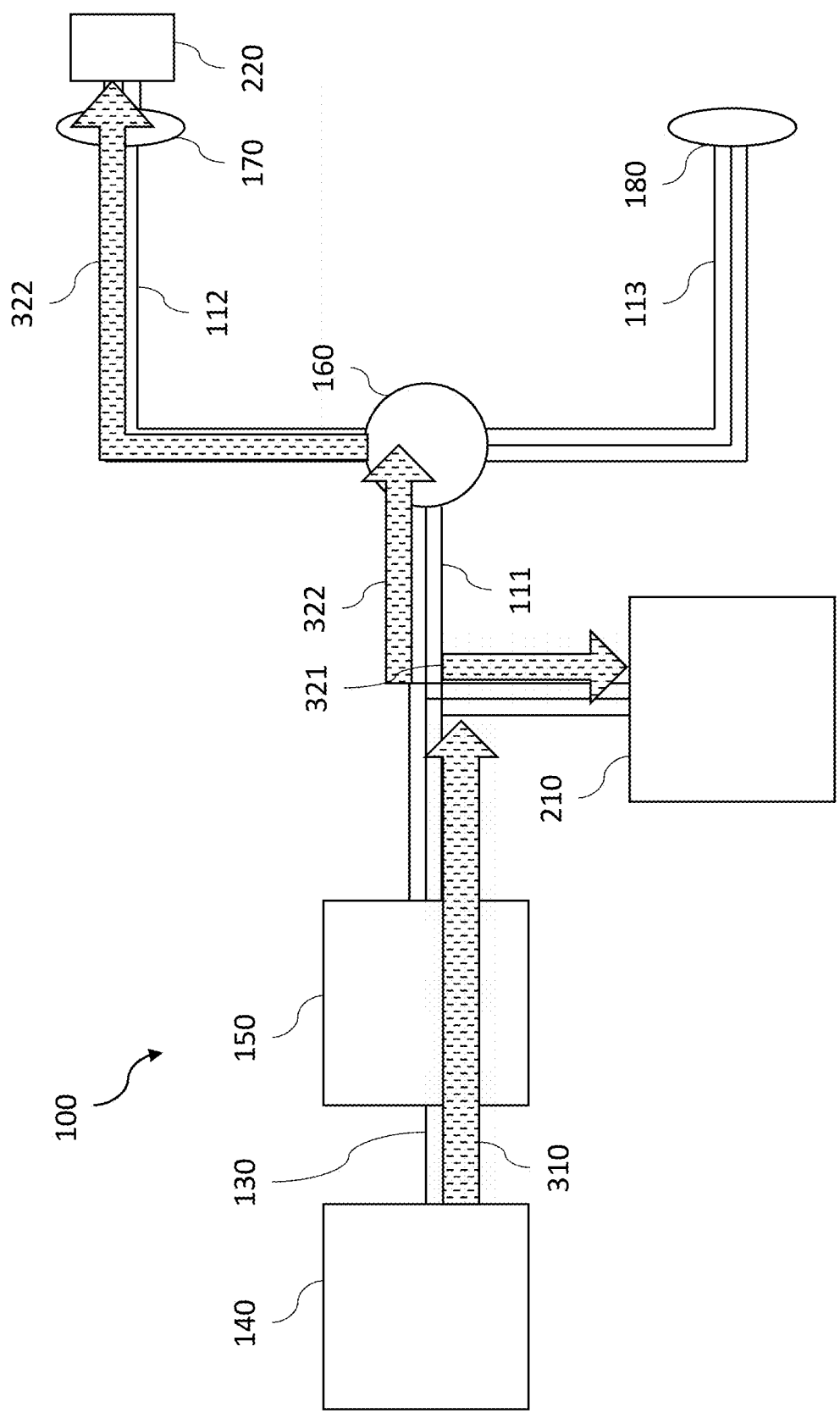

A first case is shown in FIG. 2A, and may for example occur in case the power grid 230 is not connected to the third AC bus 113, for example in case the water vehicle is away from a harbor, that is at sea.

The power distribution system 100 is here configured to simultaneously transfer power from the power storage device 140 to the first AC bus 111 via the DC bus 130 and the bidirectional AC/DC converter 150 and then to the first AC load 210 to supply and operate the at least one first AC load 210 using power from the power storage device 140, and to transfer power from the power storage device 140 to the second AC bus 112 via the DC bus 130, the bidirectional AC/DC converter 150, the first AC bus 111, and the transformer 160, and then to a second AC load 220 to supply and operate the at least second AC load 220 using power from the power storage device 140.

Here, the power storage device 140 outputs power 310 to the DC bus 113 with direct voltage, which receives power 310 and transfers it to the AC/DC converter 150. The AC/DC converter 150 receives power 310 using direct voltage, converts said power with the first alternating voltage for the first AC bus 111 and outputs it thereto. The first AC bus 111 receives the power 310 with the first alternating voltage, and transfers a first part 321 of the power 310 to the first AC load 210. The first AC load 210 receives said first part 321 of the power 310 in order to be operated therewith.

The first AC bus 111 transfers a second part 322 of the power 310 to the transformer 160. The transformer 160 receives the second part 322 of the power 310 with the first alternating voltage, converts it in power with the second alternating voltage for the second AC bus 112, and outputs the second part 322 thereto. The second AC bus 112 transfers it to the at least one second AC load 220. The at least one second AC load 220 receives the second part 322 to be operated therewith. The power 310 may also be completely transferred to the first AC load 210, that is, the second part 322 is not transferred to the second AC load 220, or the power 310 may be completely transferred to the at least one second load 220, that is, the first part 321 is not transferred to the first AC load 210.

Here, alternatively or in addition, the power distribution system 100 may be configured to simultaneously transfer power from the power storage device 140 via the DC bus 130 and to the DC load to supply and operate the DC load using power from the power storage device 140, and to transfer power from the power storage device 140 to the second AC bus 112 via the DC bus 130, the bidirectional AC/DC converter 150, the first AC bus 111, and the transformer 160, and then to a second AC load 220 to supply and operate the at least one second AC load 220 using power from the power storage device 140.

Figure 2B:
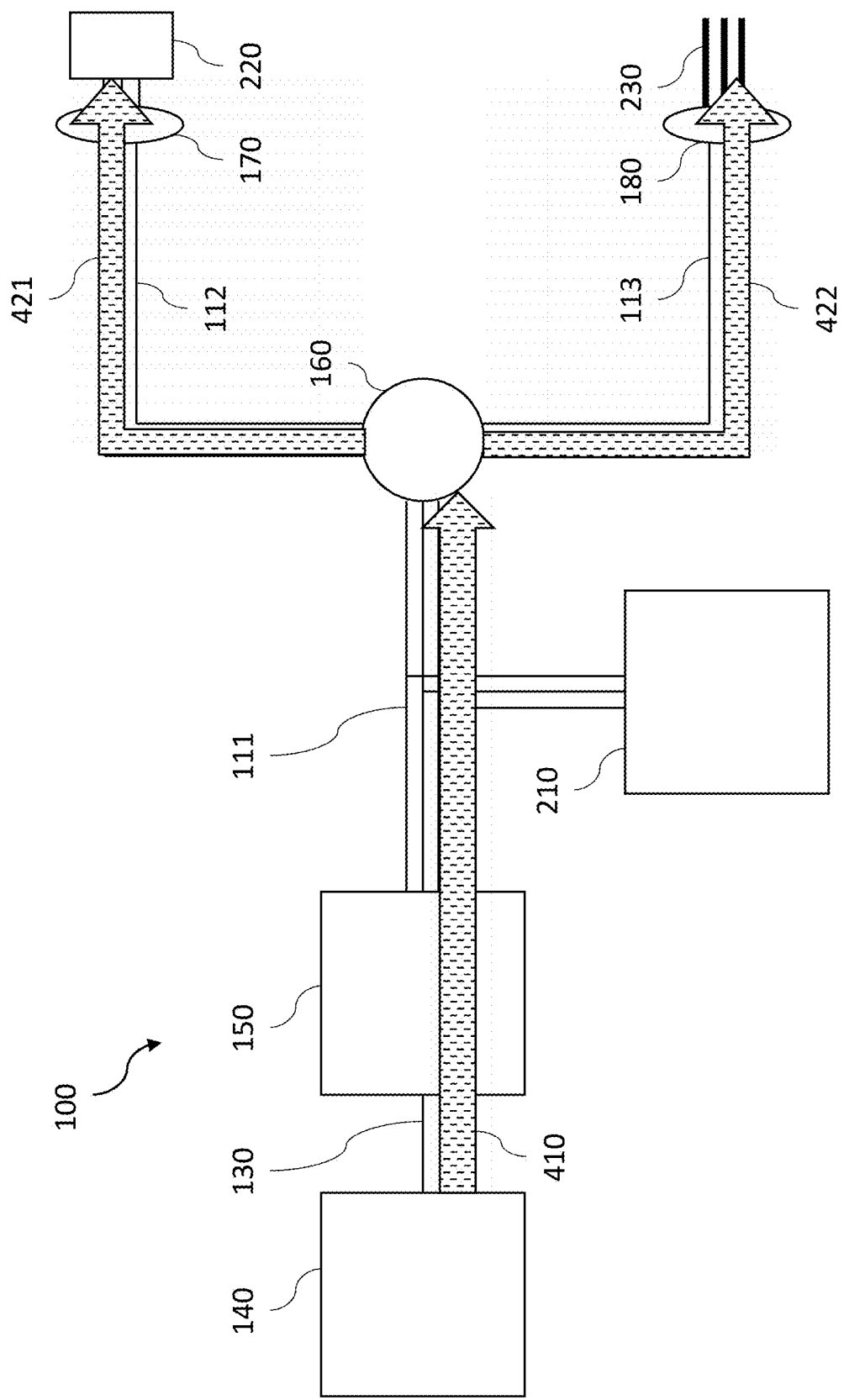

A second case is shown in FIG. 2B, and may occur for example, in case the power grid 230 is available, und the third AC bus 113 is connected thereto, for example when the water vehicle is in a harbor. In this case, the first AC load 210 may be switched off. Here, the DC load may also be switched off. Here, the power distribution system 100 may assume a peak shaving function for the power grid.

Here, the power distribution system is configured to simultaneously transfer power from the power storage device 140 to the second AC bus 112 via the DC bus 130, the bidirectional AC/DC converter, the first AC bus 111, and the transformer 160, and then to a second AC load 220 to supply and operate the at least one second AC load 220 using power from the power storage device 140, and to transfer power from the power storage device 140 to the third AC bus 113 via the DC bus, the bidirectional AC/DC converter 150, the first AC bus 111, and the transformer 160, and then to the power grid 230 to supply power from the power storage device 140 to the power grid 230.

Here, the power storage device 140 outputs power 410 to the DC bus 113 using direct voltage, which transfers the power 410 to the AC/DC converter 150. The AC/DC converter 150 receives the power 410 using direct voltage, converts said power 410 with the first alternating voltage for the first AC bus 111 and outputs it thereto. The first AC bus 111 transfers the power 410 to the transformer 160. The transformer 160 receives the power 410 and converts a first part 421 thereof in power with the second alternating voltage for the second AC bus 112, and outputs the first part 421 thereto. Further, the transformer 160 converts a second part 422 of the power 410 in power with the third alternating voltage, and outputs the second part 422 thereto.

The second AC bus 112 transfers the first part 421 to the at least one second AC load 220. The at least one second AC load 220 receives the first part 421 to be operated therewith. The third AC bus 113 transfers the second part 422 to the power grid 230, thus being supplied to the power grid 230. Alternatively, the transformer 160 completely converts the power 410 with the first alternating voltage in power with the second alternating voltage for the second AC bus 112, or completely converts power with the first alternating voltage in power with the third alternating voltage for the third AC bus 113. Thus, in the first case, the power 410 is completely transferred to the second AC load 220, that is, a second part 422 is not transferred to the third AC bus 113 and the power grid 230, respectively, and in the second case, the power 410 is completely transferred to the third AC bus 113 and the power grid 230, respectively, that is, a first part 421 is not transferred to the second AC load 220.

Figure 2C:
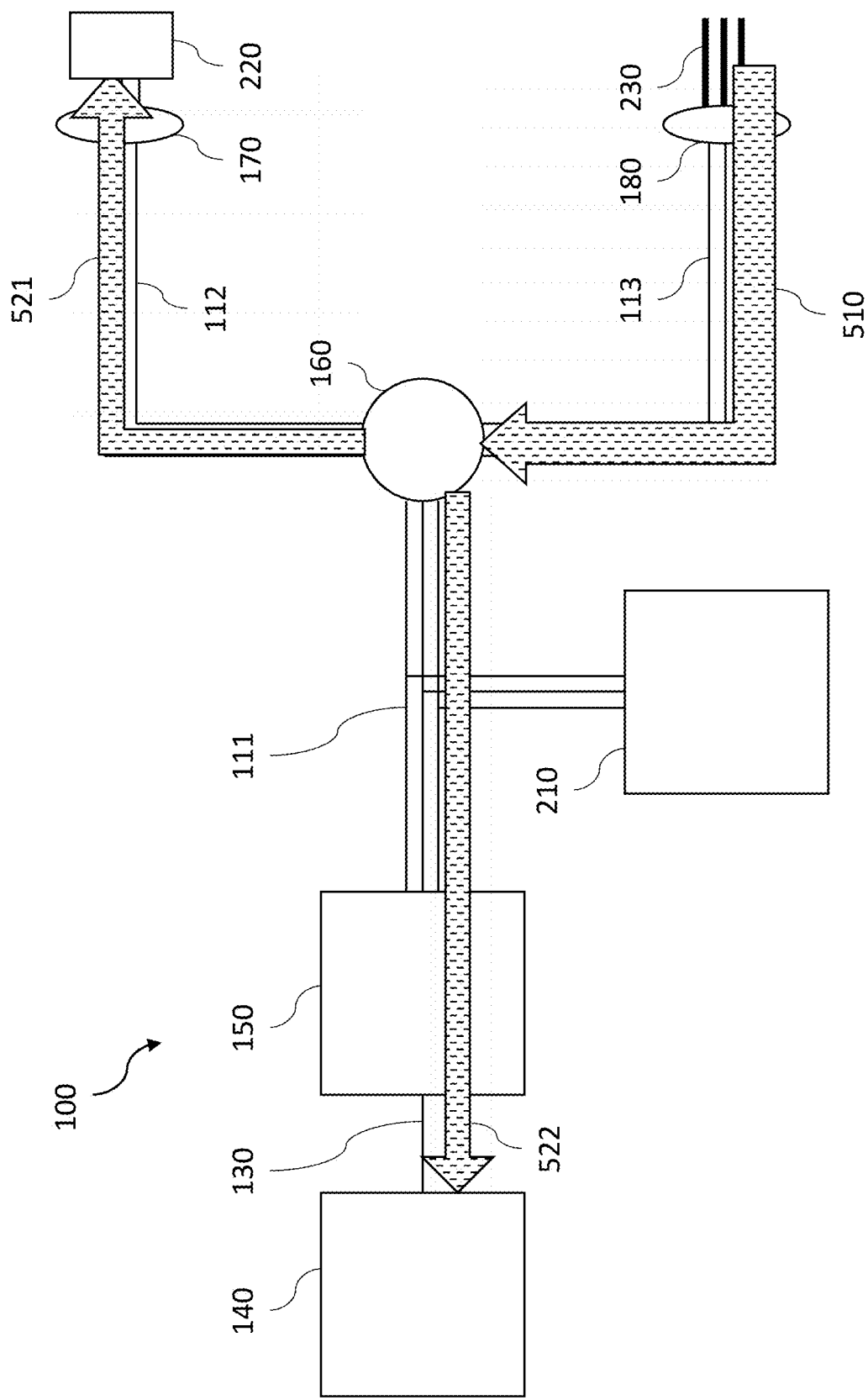

A third case is shown in FIG. 2C, and may occur, for example, in case the power grid 230 is available, und the third AC bus 113 is connected thereto, for example in case the water vehicle is located in a harbor. Here, the first AC load 210 may be switched off. The DC load may also be switched off. This way, the power storage device 140 may be loaded, and the second AC load 220, for example an auxiliary consumer of the water vehicle, may be operated at the same time. Here, the power distribution system 100 may also assume a peak shaving function for the power grid.

Here, the power distribution system 100 is configured to simultaneously transfer power from the power grid 230 to the DC bus 130 via the third AC bus 113, the transformer 160, the first AC bus 111 and the bidirectional AC/DC converter 150 and then to the power storage device 140 to load the power storage device using power from the power grid 230, and to transfer power from the power grid 230 to the second AC bus 112 via the third AC bus 113, and the transformer 160, and then to the at least one second AC load 220 to supply and operate the at least one second AC load 220 using power from the power grid 230.

Here, the power grid 230 outputs power 510 to the third AC bus 113 with the third alternating voltage. The third AC bus 113 transfers the power 510 to the transformer 160. The transformer 160 receives the power 510 with the third alternating voltage from the third AC bus 113, and converts a first part 521 after the power 510 in power with the second alternating voltage for the second AC bus, and outputs the first part 521 thereto. Further, the transformer 160 converts a second part 522 of the power 510 in power with the first alternating voltage, and outputs the second part 522 thereto. The second AC bus 112 transfers the first part 521 to the at least one second AC load 220. The at least one second AC load 220 receives the first part 522 of the power 510 to be operated therewith. The first AC bus 111 transfers the second part 522 of said power 510 to the AC/DC converter 130. The AC/DC converter 130 receives the second part 522, converts the second part 522 of the power 510 in power with the direct voltage for the DC bus 130 and outputs it thereto. The DC bus 130 transfers the second part 522 to the power storage device 140 which receives it to be loaded therewith.

Alternatively, the transformer 160 completely converts the power 510 with the third alternating voltage in power with the second alternating voltage for the second AC bus 112, or completely converts the power 510 with the third alternating voltage in power with the first alternating voltage for the first AC bus 111. Thus, in the first case, power 510 is completely transferred to the second AC load 220, that is, a second part 522 is not transferred to the third AC bus 111 and the power storage device 140, respectively, and in the second case, power 510 is completely transferred to the first AC bus 111 and the power storage device 140, respectively, that is, a first part 521 is not transferred to the second AC load 220.

Figure 2D:
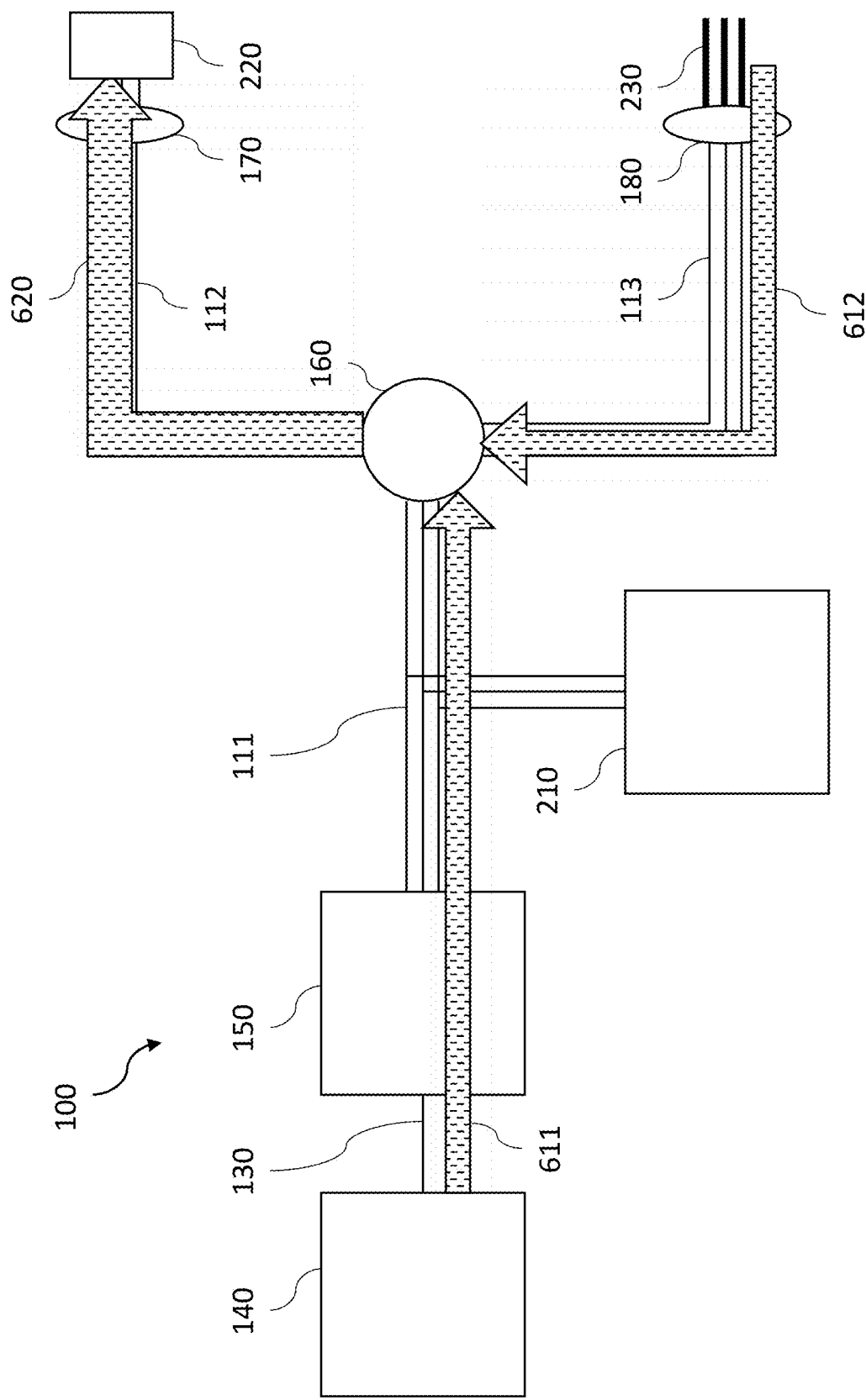

A fourth case is shown in FIG. 2D, and may happen for example, in case the power grid 230 is available, und the third AC bus 113 is connected thereto, for example in case the water vehicle is located in a harbor. Thereby, the second AC load 220 may be operated using power from the power storage device 140 and also using power from the power grid 2030. The power storage device 104 may also support the supply of the second AC load 220. Here, the first AC load 210 may be switched off. The DC load may also be switched off.

Here, the power distribution system 100 is configured to simultaneously transfer power from the power grid 230 to the second AC bus 112 via the third AC bus 113 and the transformer 160, and then to the second AC load 220, and to transfer power from the power storage device 140 to the second AC bus 112 via the DC bus 130, the bidirectional AC/DC converter 150, the first AC bus 111, and the transformer 160, and then to the at least one second AC load 220 to simultaneously supply and operate the at least one second AC load 220 using power from the power storage device 140 and the power grid 230.

Here, the power storage device 140 outputs power 611 to the DC bus 130 as power with direct voltage, which transfers the power 611 to the AC/DC converter 150. The AC/DC converter 150 receives the power 611, converts it in power for the first AC bus 111 with the first alternating voltage, and outputs it thereto. The first AC bus 111 transfers the power 611 to the transformer 160. At the same time, the power grid 230 outputs power 612 to the third AC bus 113 with the third alternating voltage. The third AC bus 113 transfers the power 612 to the transformer 160.

The transformer 160 receives power 612 from the third AC bus 113 with the third alternating voltage, and power 611 from the first AC bus 111 with the first alternating voltage, and converts the sum 620 of the power 612 and the power 611 in power with the second alternating voltage for the second AC bus 112, and outputs it thereto. The second AC bus 112 transfers the sum 620 of the powers 611, 612 to the at least one second AC load 220. The at least one second AC load 220 receives the sum 620 of the powers 611, 612 in order to be operated therewith.

Alternatively, only the power storage device 140 outputs power 611 with direct voltage, that is, the power grid 230 does not output power 612, or only the power grid 230 outputs power 612 with the third alternating voltage, that is the power storage device 140 does not output power 611. In the first case, the at least one second AC load 220 is only operated using power 611 from the power storage device 140, and in the second case, the at least one second AC load 220 is only operated using power 612 from the power grid 230.

The first AC load 210, the second AC load 220, and the DC load represent (power) sinks, as they are supplied with power in order to be operated. The power storage device 140 also represents a sink during loading. During discharging, the power storage device 140 represents a (power) source. The power grid 230 also represents a source.

FIG. 3 shows a schematic view of a transformer and a power distribution system for a water vehicle according to further embodiments of the present disclosure. The power distribution system shown in FIG. 3 is basically the same as the power distribution system shown in FIG. 1, except for the differences specified in the following. In addition, with reference to FIG. 3, further details of the power distribution system according to embodiments of the present disclosure are described. FIG. 3 show a schematically strongly simplified view of the transformer 160. In practice, preferably a transformer 160 having a closed magnetic circuit is used.

The power distribution system 200 shown in FIG. 3 is depicted as a one phase power distribution system. Here, the transformer 160 is formed as a one-phase transformer. Correspondingly, the first to third AC busses 111, 112, 113 may be configured as one-phase alternating current systems and thus comprise one phase. Thus, the first alternating voltage, the second alternating voltage, and the third alternating voltage each are one-phase alternating voltages, respectively. The first winding system 161 of the transformer 160 comprises a first winding which is connected to one phase of the first AC bus 111. The second winding system 162 of the transformer 160 comprises a second winding which is connected to one phase of the second AC bus 112. Further, the third winding system 163 of the transformer 160 includes a third winding, which is connected to the one phase of the third AC bus. Correspondingly, the power grid (not shown) may be configured as a one-phase alternating current system. The first to third winding systems 161, 162, 163 of the transformer 160 are wrapped around a common core 164. Here, the AC/DC converter 150 is also configured as having one phase.

In addition, the AC/DC converter 150 includes a line filter 151 for filtering interferences transferred to the power distribution system 100, in particular to the third and first AC bus 111, 113, and/or for filtering clock-frequency-related interferences and/or harmonics which are created by the AC/DC converter 150. By means of the line filter 151, interferences may thus be eliminated or kept away from the power grid 230 due to a switching frequency of the AC/DC converter 150 which may be in the range of 1 to 20 KHz for high performance IGBT converters, and also between 20 KHz and 100 kHz for converters having high-speed IGBTs, MOSFETs or Sic-based performance semiconductors, The line filter 150 may be configured as a low-pass filter or may comprise it.

In addition, in FIG. 3 the transfer of power from and to the power grid via the third AC bus 113, the transfer of power to at least one second AC load with the second AC bus 112, and the power transfer from and to the power storage 140 and to the first AC load 210 using the at least one first AC bus 111 are depicted by respective (double) arrows.

FIG. 4 shows a water vehicle according to embodiments of the present disclosure. The water vehicle 1000 may be configured as boat, ship, and ferry, for example. FIG. 4 shows a situation that the water vehicle is located in the harbor 1100.

The power grid 230 is land-based, in particular located in the harbor 1100.

The water vehicle 1000 comprises a power distribution system 300 according to embodiments of the present disclosure, for example the power distribution systems 100, 200 of FIGS. 1, 2A-2D, and 3. Here, the power distribution system 300 is arranged in the water vehicle 1000. The water vehicle 1000 includes a first AC load 210, an electric drive motor for driving and moving the water vehicle on the water. Alternatively, the water vehicle may include as DC load, an electric drive motor for driving and moving the water vehicle on the water. In addition, the water vehicle 1000 comprises an air conditioning as a second AC load 220.

The first AC load 210 is connected to the power distribution system 100 via the first AC bus 111. The second AC load 220 is directly connected to the power distribution system 100 via the second AC bus 112. In addition, the power distribution system 100 is connected to the power grid 230 using the power supply connection element 180. The power grid connection element 180 is here configured as a cable having an outlet. Using the power grid connection element 180, the power distribution system 100, more precisely the third AC bus 113 thereof, may be connected to the power grid 230.

The present disclosure thus provides to arrange the transformer 160 in or on the water vehicle 1000 according to embodiments of the present disclosure. The transformer 160 is configured for a line frequency, that is a frequency of the alternating voltage of the power grid 230. The transformer 160 includes three winding systems 161, 162, 163 for the first to third AC busses 111, 112, 113 to convert the first to third alternating voltages between the AC buses 111, 112, 113. The transformer 160 galvanically isolates the first to third AC busses 111, 112, 113 from each other, and in particular galvanically isolates the power grid 230 from the first AC bus 111 and the second AC bus 112. In addition, the AC/DC converter 150 is configured as being bidirectional.

In case the power grid 230 is available, for example, when the water vehicle 1000 is in the harbor, as shown in FIG. 4, the power distribution system 100, 200, 300 may be supplied with power from the land-based power grid 230 using the transformer. In particular, the power storage device 140 may be supplied with power from the power grid 230 for loading the power storage device 140, and the second AC load 220 may be supplied with power from the power grid 230 to operate the second AC load 220. Alternatively, or in addition, the second AC load 220 may also be supplied with power from the power storage device 140. Here, the power storage device 140, the second AC load 220, and also the first AC load 210 and the DC load, respectively, are galvanically separated, and thus electrically isolated from the power grid 230. More precisely, using the transformer 160 and the bidirectional AC/DC converter 150 power for loading the power storage device 140 may be provided. In addition, with the bidirectional AC/DC converter 150 and the transformer 160, the supply of the second AC load 220 may be supported. The supply of the at least one second AC load 220 with power from the power grid 230 and also with power from the power storage device 140 may also be denoted as bivalent hotel load supply.

In case the power grid 230, that is the land-based power supply system, is not available, for example, when the water vehicle 1000 is driving at sea or is remote from the harbor 1100, the first AC load 210 and the second AC load 220 may be supplied with power from the power storage device 140 using the bidirectional AC/DC converter 150 and the transformer 160.

As the inverter 150 may work in a bidirectional way, it may solely support the supply of the at least one second AC load 220, that is the auxiliary consumer, in case no land-based power grid is available. The inverter 150, being a 3-phase inverter, may provide a bidirectional DC voltage for loading the power storage device 140 using a line filter 151 from the AC power grid, for example, batteries, and AC voltage, respectively, for supplying the first AC load 210, for example an electric motor. The inverter 150 may also be configured as a motor inverter. The inverter 150 comprising the line filter 151, will also be denoted as an AFE ("Active Front End").

In said solution, a converter and/or a conversion stage is thus omitted. This results in a significant advantage in the overall efficiency during supply via the power grid 230. In addition, the number of components of the power distribution system 100, 200, 300 and the complexity thereof may be reduced. This results in an increased reliability of the power distribution system 100, 200, 300 with reduced costs. In addition, the power distribution system 100, 200, 300 may assume a peak shaving feature when connecting to the supply system.

As far as applicable, any of the single features which are presented in the exemplary embodiments, may be combined, and/or exchanged with each other, without leaving the scope of the invention.

LIST OF REFERENCE NUMBERS 100, 200, 300 power distribution system
111, 112, 113 AC buses
130 DC bus
140 power storage device
150 AC/DC converter
151 line filter
160 transformer
161, 162, 163 winding systems
163 core
170 load connection element
180 power grid connection element
210 first AC load
220 second AC load
230 power grid
1000 water vehicle
1100 harbor

The invention claimed is:

1. A power distribution system for a water vehicle, the power distribution system comprising:
 a first AC bus, a second AC bus for connecting to at least one second AC load, a third AC bus for connecting to a power grid;

a transformer configured to convert an alternating voltage from each of the first to third AC busses to an alternating voltage of each of the others of the first to third AC busses;
a DC bus, and a power storage device connected to the DC bus; and
a bidirectional AC/DC converter that is connected between the first AC bus and the DC bus,
wherein the power distribution system is configured to simultaneously transfer power from the power storage device to the second AC bus to operate the at least one second AC load using power from the power storage device and power from the power storage device to the third AC bus to supply power from the power storage device into the power grid; or
wherein the power distribution system is configured to at least one of (i) simultaneously transfer power from the power storage device to the DC bus to load the power storage device with power from the power grid, and to transfer power from the power grid to the second AC bus to operate the at least one second AC load using power from the power grid, and (ii) simultaneously transfer power from the power grid and power from the power storage device to the second AC bus to simultaneously operate the at least one second AC load using power from the power storage device and power from the power grid.

2. The power distribution system according to claim 1, wherein the transformer is further configured to galvanically isolate each of the first to third AC busses from each of the others of the first to third AC busses, and/or wherein the transformer is configured to galvanically isolate the third AC bus from the first AC bus and from the second AC bus.

3. The power distribution system according to claim 1, wherein the transformer comprises a first winding system that is connected to the first AC bus, a second winding system that is connected to the second AC bus, and a third winding system that is connected to the third AC bus.

4. The power distribution system according to claim 1, wherein the power distribution system is configured to simultaneously transfer power from the power storage device to the first AC bus to operate at least one first AC load which is connected to the first AC bus using power from the power storage device, and to transfer power from the power storage device to the second AC bus to operate the at least one second AC load using power from the power storage device.

5. The power distribution system according to claim 1, wherein at least two of a first alternating voltage of the first AC bus, a second alternating voltage of the second AC bus, and a third alternating voltage of the third AC bus are different from each other.

6. The power distribution system according to claim 1, wherein the transformer is a three-phase transformer, and/or wherein the first to third AC busses are each comprise three phases.

7. The power distribution system according to claim 1, further comprising a power grid connection element that is configured to connect the third AC bus to the power grid.

8. The power distribution system according to claim 1, further comprising a load connection element that is configured to connect the second AC bus to one of the at least one second AC load.

9. The power distribution system according to claim 1, wherein the power storage device is comprises at least one of a battery, a battery module or a battery cell.

10. The power distribution system according to claim 1, wherein the AC/DC converter comprises a line filter for filtering clock-frequency-related interferences and/or harmonics.

11. The power distribution system according to claim 1, wherein an effective value of a first alternating voltage of the first AC bus is 200V or 400V, and/or an effective value of a second alternating voltage of the second AC bus is 400V, and/or wherein an effective value of a third alternating voltage of the third AC bus and/or an effective value of an alternating voltage of the power grid is less than 1 kV.

12. A water vehicle comprising a power distribution system according to claim 1.

13. The water vehicle according to claim 12, further comprising at least one first AC load connected to the first AC bus, and/or at least one DC load connected to the DC bus.

14. The water vehicle according to claim 13, wherein the first AC load and/or the DC load is or comprises an electric motor that is at least one of an auxiliary electric motor or an electric drive motor.

15. The water vehicle according to claim 12, further comprising at least one second AC load that is directly connected to the second AC bus or that is connected to the second AC bus using a respective load connection element of the power distribution system.

16. The water vehicle according to claim 15, wherein the at least one second AC load is or comprises an air conditioning, heating, cooling system, lighting system, or power supply unit for electric devices of users on the water vehicle.

17. The power distribution system according to claim 1, wherein the power distribution system is configured to simultaneously transfer power from the power storage device to the DC bus to operate the at least one first DC load that is connected to the first DC bus using power from the power storage device, and to transfer power from the power storage device to the second AC bus to operate the at least one second AC load using power from the power storage device.

* * * * *